C. C. COOK.
SPRINKLER.
APPLICATION FILED APR. 1, 1915.

1,173,771.

Patented Feb. 29, 1916.

WITNESSES
Chas. H. Leibman
A. L. Kitchin

INVENTOR
Carson C. Cook
BY Munn & Co.
ATTORNEYS

UNITED STATES PATENT OFFICE.

CARSON CAUGHEY COOK, OF STOCKTON, CALIFORNIA.

SPRINKLER.

1,173,771.

Specification of Letters Patent.  Patented Feb. 29, 1916.

Application filed April 1, 1915.  Serial No. 18,457.

*To all whom it may concern:*

Be it known that I, CARSON C. COOK, a citizen of Canada, and a resident of Stockton, in the county of San Joaquin and State of California, have invented a new and Improved Sprinkler, of which the following is a full, clear, and exact description.

This invention relates to sprinklers and particularly to sprinklers for lawns and has for an object to provide an improved structure which may be readily moved from place to place and which may be adjusted for properly sprinkling under different circumstances.

Another object of the invention is to provide a sprinkler in which a plurality of sprinkling elements are used and independently controlled, said elements being adapted to throw the spray in different directions, thus providing a structure which may be used adjacent a pavement or in narrow spaces without throwing the water beyond the space desired.

Figure 1:
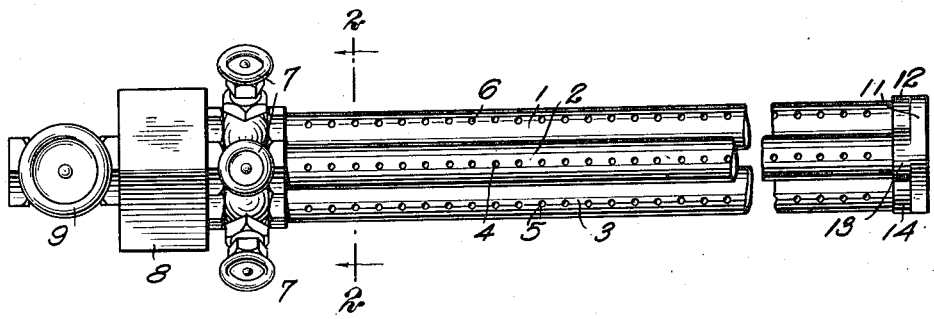
Figure 2:
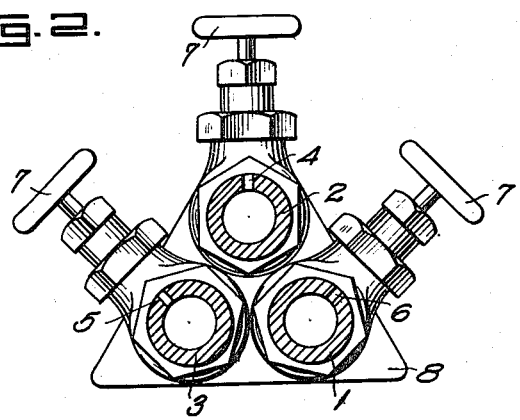

In the accompanying drawings:—Figure 1 is a plan view of an embodiment of the invention; Fig. 2 is a transverse section through Fig. 1 on line 2—2, the same being shown on an enlarged scale.

Referring to the accompanying drawings by numeral, 1, 2 and 3 indicate distributing or spraying pipes. The central pipe 2 is provided with openings 4 which extend directly upwardly, while the openings 5 and 6 in the pipes 1 and 3 are arranged to throw the water at an angle and in a direction away from pipe 2, thus distributing sprayed water over a large area. In case the sprinkler is arranged adjacent a sidewalk one of the pipes, for instance, the pipe 3, may be turned off and only the two remaining pipes used. This is usually done, as each of the pipes is provided with a control valve 7. Each of the pipes is connected with a header 8 and the header is provided with a valve 9 to which a pipe or tube may be connected. It will be noted that a cross bar 11 is provided having caps 12, 13 and 14 fitting on the outer ends of the pipes 1, 2 and 3 for preventing any escape of water from the ends. The header 8 is arranged in the form of a triangle so as to accommodate the ends of the various pipes which have outlets arranged to direct the water as heretofore described. If it is desired to use the sprinkler at a narrow place on a lawn the pipes 1 and 3 are shut off and only the central pipe used. In a large open space all three pipes are turned on.

What I claim is:—

In a sprinkler of the character described, a header, an inlet member therefor, a plurality of distributing pipes connected with said header, said pipes being arranged so as to produce a triangle in cross section, the pipe forming the apex having an opening facing upwardly and the pipes forming the base of the triangle having apertures arranged at a dihedral angle, whereby the water is distributed evenly over an appreciable area, and means connected with each of the pipes for independently controlling the water flowing therein.

In testimony whereof I have signed my name to this specification in the presence of two subscribing witnesses.

CARSON CAUGHEY COOK.

Witnesses:
  BEN MACDONALD,
  ELEANOR LACEY.